United States Patent [19]

Mory et al.

[11] 4,141,891
[45] Feb. 27, 1979

[54] QUINOLONE-AZO-ACETOACETAMINO QUINOLONE PIGMENTS

[75] Inventors: Rudolf Mory, Dornach; Rolf Müller, Aesch, both of Switzerland

[73] Assignee: Ciba-Geigy Corporation, Ardsley, N.Y.

[21] Appl. No.: 815,897

[22] Filed: Jul. 15, 1977

Related U.S. Application Data

[63] Continuation of Ser. No. 550,310, Feb. 18, 1975, abandoned.

[30] Foreign Application Priority Data

Feb. 28, 1974 [CH] Switzerland .......................... 2830/74

[51] Int. Cl.² ....................... C09B 29/32; C09B 29/36
[52] U.S. Cl. .................................. 260/155; 260/140; 260/208
[58] Field of Search ......................................... 260/155

[56] References Cited

U.S. PATENT DOCUMENTS 3,137,685  6/1964  Buckley et al. ..................... 260/155
3,684,792  8/1972  Mueller ............................... 260/155

FOREIGN PATENT DOCUMENTS 1278039  9/1968  Fed. Rep. of Germany .......... 260/155

*Primary Examiner*—Charles F. Warren
*Attorney, Agent, or Firm*—Joseph F. Di Prima

[57] ABSTRACT

Azo pigments of the formula

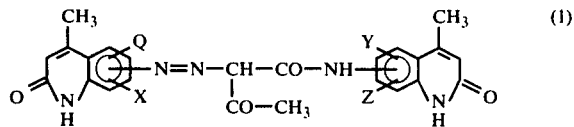

wherein Q, X, Y and Z represent hydrogen or halogen atoms, alkyl or alkoxy groups of 1 to 4 carbon atoms, aryl or aryloxy groups which can be substituted by halogen atoms or alkyl or alkoxy groups of 1 to 4 carbon atoms, and wherein Q and X and Y and Z can also be closed via vicinal carbon atoms to form an isocyclic ring which are useful for pigmenting printing dyes and high molecular organic material.

8 Claims, No Drawings

QUINOLONE-AZO-ACETOACETAMINO QUINOLONE PIGMENTS

This is a continuation of application Ser. No. 550,310, filed on Feb. 18, 1975 and now abandoned.

The invention provides useful novel azo pigments of the formula

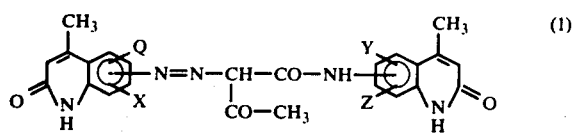

wherein Q, X, Y and Z represent hydrogen or halogen atoms, alkyl or alkoxy groups of 1 to 4 carbon atoms, aryl or aryloxy groups which are unsubstituted or substituted by halogen atoms or alkyl or alkoxy groups of 1 to 4 carbon atoms, and wherein Q and X and Y and Z can also be closed via vicinal carbon atoms to form an isocyclic ring. The novel azo pigments are obtained by coupling a diazo or diazoamino compound of an amine of the formula

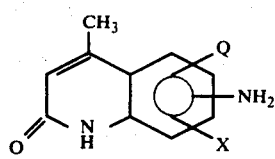

with an acetoacetic arylide of the formula

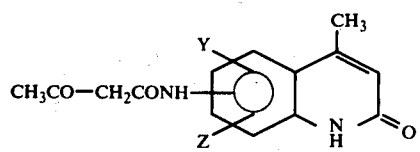

Azo pigments having a particularly interesting utility are those of the formula (1) wherein Q, X, Y and Z represent hydrogen or chlorine atoms, methyl, ethyl, methoxy, ethoxy, phenyl or phenoxy groups, especially those of the formula

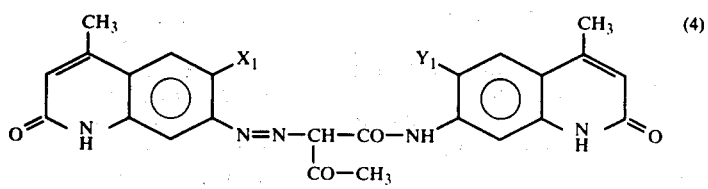

wherein $X_1$ and $Y_1$ represent hydrogen or chlorine atoms, methyl, ethyl, methoxy, ethoxy groups or phenyl or phenoxy groups which are unsubstituted or substituted by 1 or 2 chlorine atoms or methyl groups.

The colourant of the formula

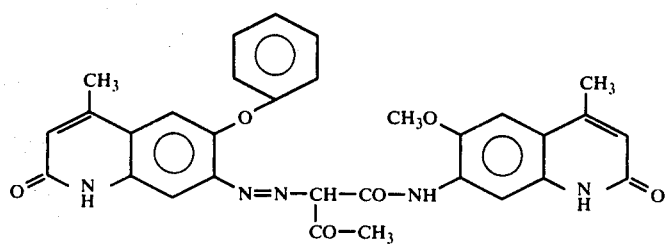

is characterised by particularly good properties.

As diazo components there are preferably used those of the formula (2), wherein Q and X represent hydrogen or chlorine atoms, methyl, ethyl, methoxy, ethoxy groups or phenyl or phenoxy groups which are unsubstituted or substituted by 1 or 2 chlorine atoms or by methyl groups.

Examples of diazo components are:

4-methyl-6-phenoxy-7-amino-quinolone-(2)
4-methyl-6-chloro-7-amino-quinolone-(2)
4-methyl-6-methoxy-7-amino-quinolone-(2)
4,6-dimethyl-7-amino-quinolone-(2)
4-methyl-7-amino-quinolone-(2)
4-methyl-7-chloro-6-amino-quinolone-(2)
4,8-dimethyl-7-amino-quinolone-(2)

There are preferably used as coupling components acetoacetic arylides of the formula (3), wherein Y and Z represent hydrogen or chlorine atoms, methyl, ethyl, methoxy, ethoxy groups or phenyl or phenoxy groups which are unsubstituted or substituted by 1 or 2 chlorine atoms or by methyl groups.

Examples of coupling components are:

4-methyl-6-methoxy-7-acetoacetylamino-quinolone-(2)
4-methyl-6-chloro-7-acetoacetylamino-quinolone-(2)
4-methyl-7-chloro-6-acetoacetylamino-quinolone-(2)
4,8-dimethyl-7-acetoacetylamino-quinolone-(2)
4-methyl-7-acetoacetylamino-quinolone-(2)
4,6-dimethyl-7-acetoacetylamino-quinolone-(2)
4-methyl-6-phenoxy-7-acetoacetylamino-quinolone-(2).

The acetoacetic arylides to be used according to the invention are obtained, for example, by addition of diketone to the amino-quinolones-(2).

The coupling is normally effected by gradually adding the acid solution of the diazonium salt to the aqueous alkaline or aqueous acetic acid solution or also aqueous acetic acid suspension of the coupling component or its solution in an organic water-immiscible solvent, desirably at a pH of 4 to 7.

It is advantageous to adjust the pH by addition of a buffer. Examples of suitable buffers are the salts, especially alkaline salts, of formic acid, phosphoric acid or, in particular, of acetic acid. The alkaline solution of the coupling component desirably contains a wetting agent, a dispersant or an emulsifier, for example an aralkylsulphonate, such as dodecylbenzenesulphonate or the sodium salt of 1,1'-dinaphthylmethanesulphonic acid, polycondensation products of alkylene oxides, for example the reaction product of ethylene oxide and p-tert. octylphenyl, also alkyl esters of sulphoricinoleates, for example n-butylsulphoricinoleate. The dispersion of the coupling component can also contain with advantage protective colloids, for example methyl cellulose or small amounts of inert organic solvents which are sparingly soluble or insoluble in water, for example aromatic hydrocarbons which may be halogenated or nitrated, such as benzene, toluene, xylene, chlorobenzene, dichlorobenzene or nitrobenzene, as well as aliphatic halogenated hydrocarbons, for example carbon tetrachloride or trichloroethylene, also water-miscible organic solvents, such as acetone, methyl ethyl ketone, methanol, ethanol or isopropanol, especially dimethyl formamide.

It is also possible to carry out the coupling with advantage by continuously combining an acid solution of the diazonium salt with an alkaline solution of the coupling component in a mixing jet so as to effect an immediate coupling of the components. The resultant colourant dispersant is continually drawn off from the mixing jet and the colourant isolated by filtration.

Instead of using the diazonium salt it is also possible to use the corresponding diazoamino compounds. These are obtained by a known method by coupling an aryldiazonium salt with a primary or preferably with a secondary amine. Amines of the most diverse kinds are suitable for this purpose, for example aliphatic amines, such as methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid, β-aminoethylsulphuric acid, alicyclic amines, such as cyclohexylamine, N-methylcyclohexylamine, dicyclohexylamine, aromatic amines, such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-amino-naphthalene-4-sulphonic acid, 1-aminonaphthalene-2,4-disulphonic acid, heterocyclic amines, such as piperidine, morpholine, pyrrolidine, dihydroindole, and finally also sodium cyanamide or dicyandiamide.

As a rule, the diazoamino compounds obtained are sparingly soluble in water and can be isolated from the reaction medium in crystallised form, if appropriate after they have been salted out. In many instances the moist press cakes can be used for the further reaction. In individual cases it may prove desirable to dehydrate the diazoamides before the reaction by means of vacuum drying.

The coupling of the diazoamino compound with the coupling component takes place in an organic solvent, for example chlorobenzene, o-dichlorobenzene, nitrobenzene, pyridine, ethylene glycol, ethylene glycol monoethyl or monomethyl ether, dimethyl formamide, formic acid or acetic acid. When using water-miscible solvents it is not necessary to use the diazoamino compounds in anhydrous form. The aqueous moist filter cakes may be used, for example.

Finally, the coupling can also be effected by suspending the amine with the coupling component in the ratio 1:1 in an organic solvent and treating the resultant suspension with a diazotising agent, especially with an ester of nitric acid, such as methyl, ethyl, butyl, amyl or actyl nitrite.

On account of their insolubility, the resultant pigments can be isolated from the reaction mixture by filtering them off. Since the by-products remain in solution, the pigments are obtained in outstanding purity. It is expedient to subject the pigments, especially those obtained by the aqueous coupling method, to an aftertreatment with organic solvents. This is accomplished by heating the resultant crude pigments in an inert organic solvent, for example methylene glycol monomethyl ether, ethylene glycol monomethyl ether, dimethyl formamide, N-methylpyrrolidone, monochloro- or dichlorobenzene, toluene, xylene or nitrobenzene, after which treatment they are obtained in the form of soft-grained powders.

The colourants constitute productive and pure pigments which, on account of their favourable properties, such as fastness to migration and light, can be used for the most diverse kinds of pigment application. They are eminently suitable for use in the printing ink industry and also for pigmenting organic material of high molecular weight, for example cellulose ethers and esters, polyamides and polyurethanes or polyesters, acetyl cellulose, nitrocellulose, natural or synthetic resins, such as polymerisation or condensation resins, for example aminoplasts, especially urea/formaldehyde and melamine/formaldehyde resins, alkyd resins, phenolic plastics, polycarbonates, polyolefins, such as polystyrene, polyvinyl chloride, polyethylene, polypropylene, polyacrylonitrile, polyacrylic ester, rubber, casein, silicon and silicone resins, individually or in mixtures.

It is immaterial whether the cited compounds of high molecular weight are in the form of plastics, melts or spinning solutions, paints or lacquers or printing inks. Depending on the use to which they are put, it is advantageous to use the novel pigments as toners or in the form of preparations.

The resultant colourations are characterised by good general fastness properties, especially by good fastness to light, migration and overstripe bleeding.

The following Examples illustrate the invention, the parts and percentages being by weight unless otherwise stated.

EXAMPLE 1

While cooling with ice, 2.66 parts of 4-methyl-6-phenoxy-7-amino-quinolone-(2) are diazotised in the usual manner in 100 parts of water with 2.5 parts by volume of 10 normal hydrochloric acid and 2.5 parts of 4 normal sodium nitrite solution. The diazo solution is clarified by filtration. 2.88 parts of 4-methyl-6-methoxy-7-acetoacetylaminoquinolone-(2) are added to 200 parts by volume of dimethyl formamide. After 3 parts of anhydrous sodium acetate have been added, the above diazo solution is poured in over c. 2 minutes. The coupling mixture is stirred for several hours at room temperature and the pigment which has formed is filtered off, washed with hot water and methanol and dried. The product is obtained as a brown, hard-grained substance which retains its colouristically useful form by treating it in boiling N-methylpyrrolidone over the course of half an hours. After it has been isolated at room temperature, washed with methanol and dried, the pigment is a soft-grained yellow powder which colours polyvinyl chloride in a yellow shade which is fast to light and migration and has the formula

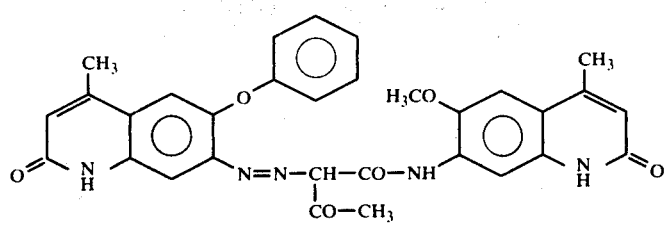

The Table lists further pigments which are obtained by the same procedure by coupling the diazo compound of the amine indicated in column I with the coupling component indicated in column II. Column III indicates the shade of the resultant pigment dye in polyvinyl chloride.

| | I | II | III |
|---|---|---|---|
| 2 | 4-methyl-6-chloro-7-amino-quinolone-(2) | 4-methyl-7-chloro-6-acetoacetylamino-quinolone-(2) | yellow |
| 3 | 4-methyl-6-methoxy-7-amino-quinolone-(2) | 4-methyl-7-chloro-6-acetoacetylamino-quinolone-(2) | reddish yellow |
| 4 | 4,6-dimethyl-7-amino-quinolone-(2) | 4-methyl-7-chloro-6-acetoacetylamino-quinolone-(2) | yellow |
| 5 | 4-methyl-7-amino-quinolone-(2) | 4-methyl-7-chloro-6-acetoacetylamino-quinolone-(2) | greenish yellow |
| 6 | 4-methyl-7-chloro-6-amino-quinolone-(2) | 4-methyl-7-chloro-6-acetoacetylamino-quinolone-(2) | reddish yellow |
| 7 | 4,8-dimethyl-7-amino-quinolone-(2) | 4-methyl-7-chloro-6-acetoacetylamino-quinolone-(2) | yellow |
| 8 | 4-methyl-7-amino-quinolone-(2) | 4-methyl-6-chloro-7-acetoacetylamino-quinolone-(2) | greenish yellow |
| 9 | 4,6-dimethyl-7-amino-quinolone-(2) | 4-methyl-6-chloro-7-acetoacetylamino-quinolone-(2) | yellow |
| 10 | 4,8-dimethyl-7-amino-quinolone-(2) | 4-methyl-6-chloro-7-acetoacetylamino-quinolone-(2) | greenish yellow |
| 11 | 4-methyl-6-methoxy-7-amino-quinolone-(2) | 4-methyl-6-chloro-7-acetoacetylamino-quinolone-(2) | yellow |
| 12 | 4-methyl-6-phenoxy-7-amino-quinolone-(2) | 4-methyl-6-chloro-7-acetoacetylamino-quinolone-(2) | greenish yellow |
| 13 | 4-methyl-6-chloro-7-amino-quinolone-(2) | 4-methyl-6-chloro-7-acetoacetylamino-quinolone-(2) | greenish yellow |
| 14 | 4-methyl-7-chloro-6-amino-quinolone-(2) | 4-methyl-6-chloro-7-acetoacetylamino-quinolone-(2) | greenish yellow |
| 15 | 4-methyl-7-amino-quinolone-(2) | 4,8-dimethyl-7-acetoacetylamino-quinolone-(2) | greenish yellow |
| 16 | 4,6-dimethyl-7-amino-quinolone-(2) | 4,8-dimethyl-7-acetoacetylamino-quinolone-(2) | reddish yellow |
| 17 | 4,8-dimethyl-7-amino-quinolone-(2) | 4,8-dimethyl-7-acetoacetylamino-quinolone-(2) | yellow |
| 18 | 4-methyl-6-methoxy-7-amino-quinolone-(2) | 4,8-dimethyl-7-acetoacetylamino-quinolone-(2) | orange |
| 19 | 4-methyl-6-phenoxy-7-amino-quinolone-(2) | 4,8-dimethyl-7-acetoacetylamino-quinolone-(2) | greenish yellow |
| 20 | 4-methyl-6-chloro-7-amino-quinolone-(2) | 4,8-dimethyl-7-acetoacetylamino-quinolone-(2) | yellow |
| 21 | 4-methyl-7-chloro-6-amino-quinolone-(2) | 4,8-dimethyl-7-acetoacetylamino-quinolone-(2) | reddish yellow |
| 22 | 4-methyl-7-amino-quinolone-(2) | 4-methyl-7-acetoacetylamino-quinolone-(2) | greenish yellow |
| 23 | 4,6-dimethyl-7-amino-quinolone-(2) | 4-methyl-7-acetoacetylamino-quinolone-(2) | reddish yellow |
| 24 | 4-methyl-6-methoxy-7-amino-quinolone-(2) | 4-methyl-7-acetoacetylamino-quinolone-(2) | reddish yellow |
| 25 | 4-methyl-6-phenoxy-7-amino-quinolone-(2) | 4-methyl-7-acetoacetylamino-quinolone-(2) | greenish yellow |
| 26 | 4-methyl-6-chloro-7-amino-quinolone-(2) | 4-methyl-7-acetoacetylamino-quinolone-(2) | yellow |
| 27 | 4-methyl-7-chloro-6-amino-quinolone-(2) | 4-methyl-7-acetoacetylamino-quinolone-(2) | reddish yellow |
| 28 | 4-methyl-7-amino-quinolone-(2) | 4,6-dimethyl-7-acetoacetylamino-quinolone-(2) | greenish yellow |
| 29 | 4,8-dimethyl-7-amino-quinoline-(2) | 4,6-dimethyl-7-acetoacetylamino-quinolone-(2) | greenish yellow |
| 30 | 4-methyl-6-methoxy-7-amino-quinolone-(2) | 4,6-dimethyl-7-acetoacetylamino-quinolone-(2) | reddish yellow |
| 31 | 4-methyl-6-phenoxy-7-amino-quinolone-(2) | 4,6-dimethyl-7-acetoacetylamino-quinolone-(2) | greenish yellow |
| 32 | 4-methyl-6-chloro-7-amino-quinolone-(2) | 4,6-dimethyl-7-acetoacetylamino-quinolone-(2) | greenish yellow |
| 33 | 4-methyl-7-amino-quinolone-(2) | 4-methyl-6-phenoxy-7-acetoacetylamino-quinolone-(2) | greenish yellow |
| 34 | 4,6-dimethyl-7-amino-quinolone-(2) | 4-methyl-6-phenoxy-7-acetoacetylamino-quinolone-(2) | greenish yellow |
| 35 | 4-methyl-6-methoxy-7-amino-quinolone-(2) | 4-methyl-6-phenoxy-7-acetoacetylamino-quinolone-(2) | yellow |
| 36 | 4-methyl-6-phenoxy-7-amino-quinolone-(2) | 4-methyl-6-phenoxy-7-acetoacetylamino-quinolone-(2) | greenish yellow |
| 37 | 4-methyl-6-chloro-7-amino-quinolone-(2) | 4-methyl-6-phenoxy-7-acetoacetylamino-quinolone-(2) | greenish yellow |
| 38 | 4-methyl-7-chloro-6-amino-quinolone-(2) | 4-methyl-6-phenoxy-7-acetoacetylamino-quinolone-(2) | yellow |
| 39 | 4-methyl-7-amino-quinolone-(2) | 4-methyl-6-methoxy-7-acetoacetylamino-quinolone-(2) | yellow |
| 40 | 4,6-dimethyl-7-amino-quinolone-(2) | 4-methyl-6-methoxy-7-acetoacetylamino-quinolone-(2) | greenish yellow |
| 41 | 4,8-dimethyl-7-amino-quinolone-(2) | 4-methyl-6-methoxy-7-acetoacetylamino-quinolone-(2) | greenish yellow |
| 42 | 4-methyl-6-methoxy-7-amino-quinolone-(2) | 4-methyl-6-methoxy-7-acetoacetylamino-quinolone-(2) | yellow |
| 43 | 4-methyl-6-chloro-7-amino-quinolone-(2) | 4-methyl-6-methoxy-7-acetoacetylamino-quinolone-(2) | yellow |
| 44 | 4-methyl-7-chloro-6-amino-quinolone | 4-methyl-6-methoxy-7-acetoacetylamino-quinolone-(2) | greenish yellow |
| 45 | 4-methyl-6-phenoxy-7-amino-quinolone-(2) | 4-methyl-7-chloro-6-acetoacetylamino-quinolone-(2) | yellow |
| 46 | 4-methyl-6-(4'-chlorophenoxy)-7-amino-quinolone-(2) | 4-methyl-6-acetoacetyl-amino-quinolone-(2) | yellow |
| 47 | 4-methyl-6-(4'-chlorophenoxy)-7-amino-quinolone-(2) | 4,6-dimethyl-7-acetoacetylamino-quinolone-(2) | greenish yellow |

| | I | II | III |
|---|---|---|---|
| 48 | 4-methyl-6-(4'-chlorophenoxy)-7-amino-quinolone-(2) | 4,8-dimethyl-7-acetoacetylamino-quinolone-(2) | greenish yellow |
| 49 | 4-methyl-6-(4'-chlorophenoxy)-7-amino-quinolone-(2) | 4-methyl-6-methoxy-7-acetoacetylamino-quinolone-(2) | yellow |
| 50 | 4-methyl-6-(4'-chlorophenoxy)-7-amino-quinolone-(2) | 4-methyl-6-phenoxy-7-acetoacetylamino-quinolone-(2) | greenish yellow |
| 51 | 4-methyl-6-(4'-chlorophenoxy)-7-amino-quinolone-(2) | 4-methyl-6-chloro-7-acetoacetylamino-quinolone-(2) | greenish yellow |
| 52 | 4-methyl-6-(4'-chlorophenoxy)-7-amino-quinolone-(2) | 4-methyl-7-chloro-8-acetoacetylamino-quinolone-(2) | greenish yellow |
| 53 | 4-methyl-6-(4'-chlorophenoxy)-7-amino-quinolone-(2) | 4-methyl-7-chloro-8-acetoacetylamio-quinolone-(2) | greenish yellow |
| 54 | 4,5,8-trimethyl-6-amino-quinolone-(2) | 4-methyl-7-acetoacetyl-amino-quinolone-(2) | yellow |
| 55 | 4,5,8-trimethyl-6-amino-quinolone-(2) | 4,6-dimethyl-7-acetoacetylamino-quinolone-(2) | yellow |
| 56 | 4,5,8-trimethyl-6-amino-quinolone-(2) | 4,8-dimethyl-7-acetoacetylamino-quinolone-(2) | reddish yellow |
| 57 | 4,5-dimethyl-8-methoxy-6-amino-quinolone-(2) | 4,8-dimethyl-7-acetoacetylamino-quinolone-(2) | reddish yellow |
| 58 | 4,5-dimethyl-8-methoxy-6-amino-quinolone-(2) | 4-methyl-6-phenoxy-7-acetoacetylamino-quinolone-(2) | yellow |
| 59 | 4-methyl-5,8-dimethoxy-6-amino-quinolone-(2) | 4-methyl-6-phenoxy-7-acetoacetylamino-quinolone-(2) | yellow |
| 60 | 4-methyl-6-amino-7,8-benzo-quinolone-(2) | 4-methyl-6-phenoxy-7-acetoacetylamino-quinolone-(2) | yellow |
| 61 | 4-methyl-6-amino-7,8-benzo-quinolone-(2) | 4-methyl-6-chloro-7-acetoacetylamino-quinolone-(2) | orange |
| 62 | 4-methyl-6-amino-7,8-benzo-quinolone-(2) | 4-methyl-7-chloro-6-acetoacetylamino-quinolone-(2) | orange |
| 63 | 4-methyl-5,8-diethoxy-6-amino-quinolone-(2) | 4,8-dimethyl-7-acetoacetylamino-quinolone-(2) | reddish yellow |

EXAMPLE 64

65 parts of stabilised polyvinyl chloride, 35 parts of dioctyl phthalate and 0.2 parts of the colourant obtained according to Example 1 are stirred together and the mixture is then rolled to and from for 7 minutes at 140° C. on a two-roll calender to yield a yellow sheet of good fastness to light and migration.

EXAMPLE 65

1 g of the pigment obtained according to Example 1 and 4 g of the lithio varnish of the following composition 29.4% of linseed oil/stand oil (300 poise)
67.2% of linseed oil/stand oil (20 poise)
2.1% of cobalt octoate (8% Co) and
1.3% of lead octoate (24% Pb)

are finely ground in an Engelsmann grinder and subsequently printed on art paper using a block by the letterpress printing method (application of 1 g/m²). A strong, bright, orange yellow shade of good transparency and good gloss is obtained. Very brilliant green shades can be obtained in three or four colour printing by overprinting on blue. The pigment is also suitable for other printing methods, for example intaglio printing, offset printing, flexographic printing, whereby equally good results are obtained.

We claim:

1. An azo pigment of the formula

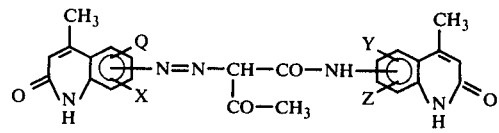

wherein Q, X, Y and Z independently represent hydrogen; halo; alkyl of 1-4 carbon atoms; alkoxy of 1-4 carbon atoms; aryl; aryl substituted by halo, alkyl of 1-4 carbon atoms, or alkoxy of 1-4 carbon atoms; aryloxy; or aryloxy substituted by halo, alkyl of 1-4 carbon atoms or alkoxy of 1-4 carbon atoms.

2. An azo pigment according to claim 1, wherein Q, X, Y and Z independently represent hydrogen, chloro, methyl, ethyl, methoxy, ethoxy, phenyl or phenoxy.

3. An azo pigment according to claim 1 of the formula

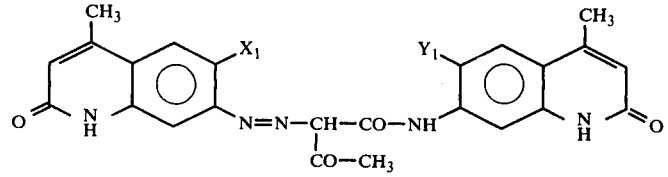

wherein $X_1$ and $Y_1$ independently represent hydrogen; chloro; methyl; ethyl; methoxy; ethoxy; phenyl; phenyl substituted by 1 or 2 chloro or methyl; phenoxy; or phenoxy substituted by 1 or 2 chloro or methyl.

4. Azo pigment according to claim 1, of the formula

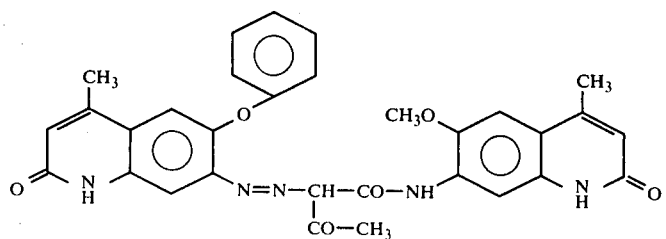

5. Azo pigment according to claim 1, of the formula
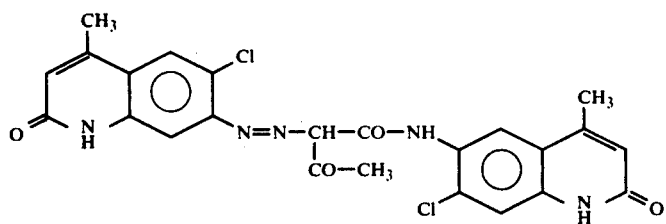
6. Azo pigment according to claim 1, of the formula
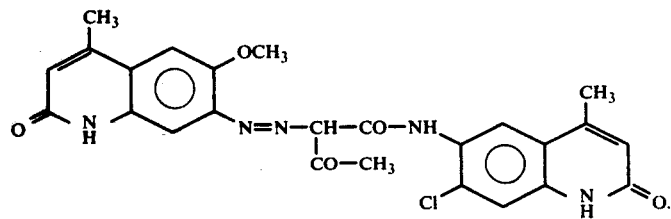
7. Azo pigment according to claim 1, of the formula
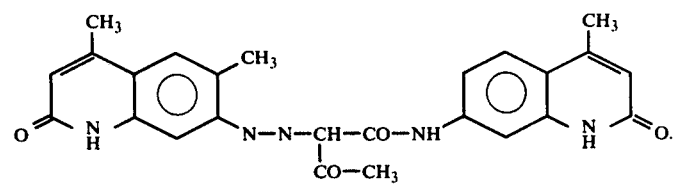
8. Azo pigment according to claim 1, of the formula
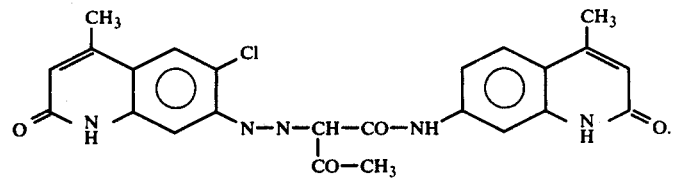
* * * * *